US012643262B2

(12) United States Patent
Steinmetz

(10) Patent No.: US 12,643,262 B2
(45) Date of Patent: Jun. 2, 2026

(54) CERAMIC COMPOSITE

(71) Applicant: SHILDAN, INC., Mount Laurel, NJ (US)

(72) Inventor: Moshe Steinmetz, Mount Laurel, NJ (US)

(73) Assignee: Shildan Inc., Mount Laurel, NJ (US)

( * ) Notice: Subject to any disclaimer, the term of this patent is extended or adjusted under 35 U.S.C. 154(b) by 293 days.

(21) Appl. No.: 18/289,320

(22) PCT Filed: May 4, 2021

(86) PCT No.: PCT/US2021/030598
§ 371 (c)(1),
(2) Date: Nov. 2, 2023

(87) PCT Pub. No.: WO2022/235257
PCT Pub. Date: Nov. 10, 2022

(65) Prior Publication Data
US 2024/0246259 A1 Jul. 25, 2024

Related U.S. Application Data

(63) Continuation-in-part of application No. 15/773,451, filed as application No. PCT/US2016/060460 on Nov. 4, 2016, now Pat. No. 11,027,456.

(60) Provisional application No. 62/251,331, filed on Nov. 5, 2015.

(51) Int. Cl.
| *B28B 11/24* | (2006.01) |
| *B28B 1/00* | (2006.01) |
| *B28B 11/04* | (2006.01) |
| *C04B 33/34* | (2006.01) |

(52) U.S. Cl.
CPC ............ *B28B 11/243* (2013.01); *B28B 1/002* (2013.01); *B28B 11/044* (2013.01); *C04B 33/34* (2013.01)

(58) Field of Classification Search
CPC ..... B28B 1/002; B28B 11/044; B28B 11/243; B28B 3/20; C04B 2235/6021; C04B 2237/64; C04B 33/34; C04B 35/622; E04F 15/08
See application file for complete search history.

(56) References Cited

U.S. PATENT DOCUMENTS

| 2011/0091730 A1 | 4/2011 | Hoppe et al. |
| 2015/0259253 A1 | 9/2015 | Fellows et al. |
| 2016/0243724 A1 | 8/2016 | Kitaguchi |
| 2018/0326614 A1 | 11/2018 | Steinmetz |
| 2019/0168489 A1 | 6/2019 | Benkert et al. |

FOREIGN PATENT DOCUMENTS

EP 0462473 A2 12/1991

*Primary Examiner* — Lawrence D Ferguson
(74) *Attorney, Agent, or Firm* — Dilworth & Barrese, LLP

(57) ABSTRACT

A composite ceramic element is provided in which the individual ceramic elements are passed on rollers and fired in a kiln, glazed and subsequently secured together.

17 Claims, 17 Drawing Sheets

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE 32b      10 7/16" [264.0]      5/16" [7.0]

7 7/8" [48.0]

cold engobed 3
2      Ø 7/8" [39.4]

notch cutting 1 9/16" [39.3]

32a      1'-0" [304.8]

1 9/16"

1. TERRACOTTA NESTED BAGUETTES
2. INNER TUBE
3. END PLATE

1. TERRACOTTA NESTED BAGUETTES
2. INNER TUBE
3. END PLATE

1. TERRACOTTA NESTED BAGUETTES
2. INNER TUBE
3. END PLATE 33    33

33    33

1. TERRACOTTA NESTED BAGUETTES
2. INNER TUBE
3. END PLATE

CERAMIC COMPOSITE

BACKGROUND OF THE INVENTION

The present invention relates to improved extruding, glazing and firing of clay or ceramic elements. More particularly, the present invention relates to an improved ceramic element which can be extruded, glazed and fired without damaging the outer surface thereof.

Clay or ceramic elements have been fired in a kiln by passing therealong on rollers. One side of such clay or ceramic elements has production marks interfering with providing smooth outer surfaces upon firing, or becomes undersirably roughened by passing through the kiln on rollers. Furthermore, providing unique shapes of such elements was limited because not all such configurations could stably pass through the kiln on rollers.

For example, the bottom surfaces of the prior art ceramic elements illustrated in FIGS. 10 and 11 could not be successfully glazed because these surfaces rested against the rollers while passing through the kiln. Uneven surfacing was especially a problem with the prior art ceramic having the curved surfaces illustrated in FIG. 11, because these elements tend to rock while passing along the rollers in the kiln, resulting in uneven firing and subsequent glazing.

The present invention solves these disadvantages by versatilely firing the ceramics without damaging the outer surfaces thereof.

SUMMARY OF THE INVENTION

Accordingly, it is an object to improve, extruding, glazing and firing of clay or ceramic elements, to provide undamaged outer surfaces thereof.

These and other objects are attained by the present invention which is directed to a composite having pair of clay or ceramic elements mating and secured together in complementary fashion after being individually passed on rollers through a kiln. The outer surface(s) of the composite is glazed either before or after firing in the kiln, in any event before securing the individual elements together. After extrusion, the individual ceramic elements are advanced through the kiln on rollers. Previously, it was not possible to successfully glaze the surfaces of the ceramic before or after passing along the rollers, because this surface was unduly roughened. Moreover, ceramics designed to have irregular outer surfaces, e.g., curved, V-shaped, rippled or corrugated, could not be stably balanced and passed along the rollers through the kiln to ensure comprehensive uniform extrusion, glazing and firing along all surfaces.

With the present invention it is now possible to successfully extrude, glaze and fire the ceramic in a kiln without damaging the outer surface thereof, to provide a uniform ceramic. The inner surface of each element contacting the rollers in the kiln now bears the production marks and does not interfere with smoothing or glazing the outer surface of the composite formed thereby.

BRIEF DESCRIPTION OF THE DRAWINGS

The present invention will be described in greater detail with reference to the accompanying drawings in which FIG. 1 schematically illustrates an end view of a first embodiment according to the present invention, FIG. 2 schematically illustrates an end view of a second embodiment according to the present invention, FIG. 3 schematically illustrates an end view of a third embodiment according to the present invention, FIG. 4 schematically illustrates an end view of a fourth embodiment according to the present invention, FIG. 5 schematically illustrates an end view of a fifth embodiment according to the present invention, FIG. 6 schematically illustrates an end view of a sixth embodiment according to the present invention, FIG. 7 schematically illustrates an end view of a seventh embodiment according to the present invention, FIG. 8 schematically illustrates an end view of an eighth embodiment according to the present invention.

DESCRIPTION OF THE PREFERRED EMBODIMENTS

Figure 1:
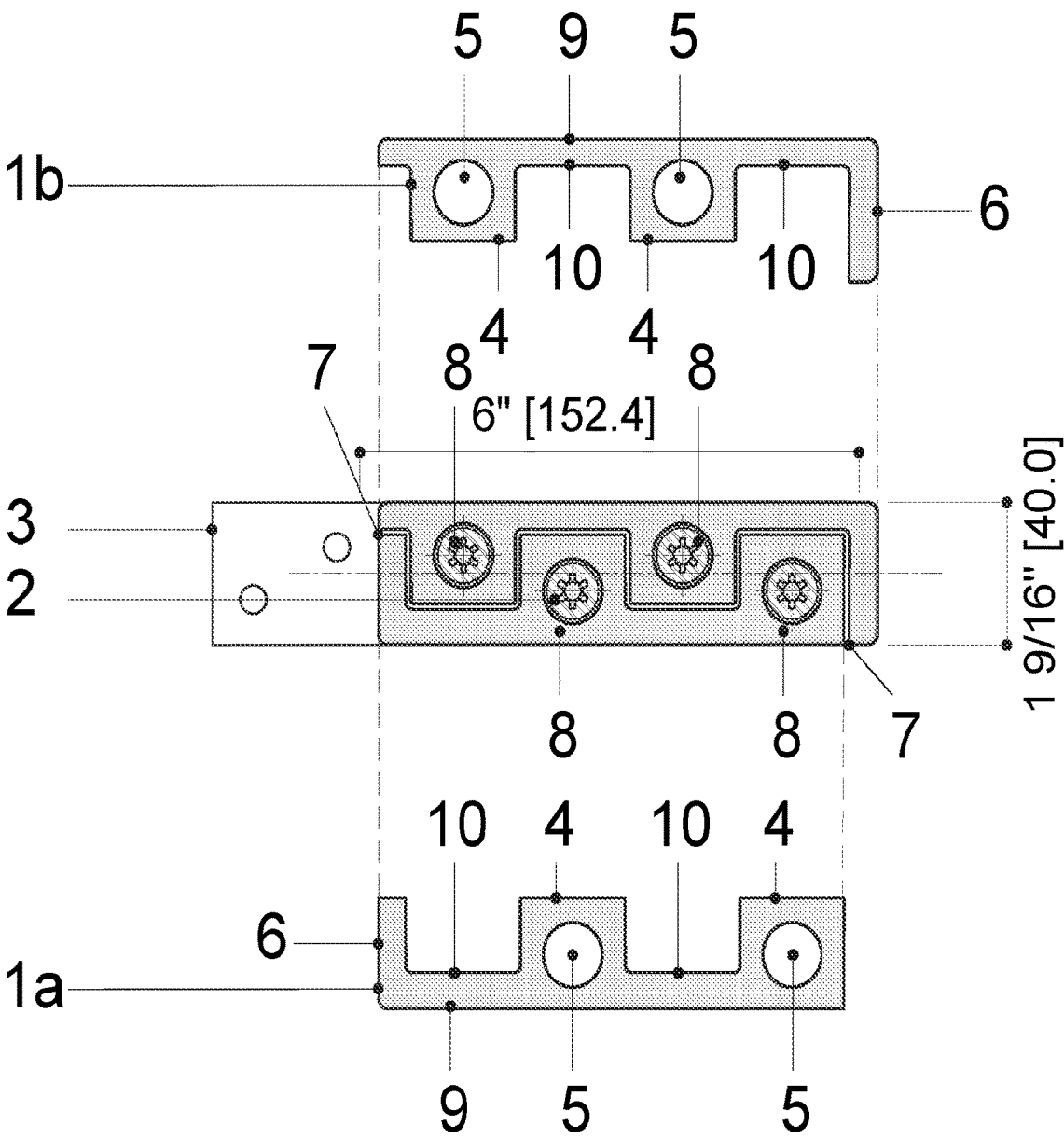
Figure 9:
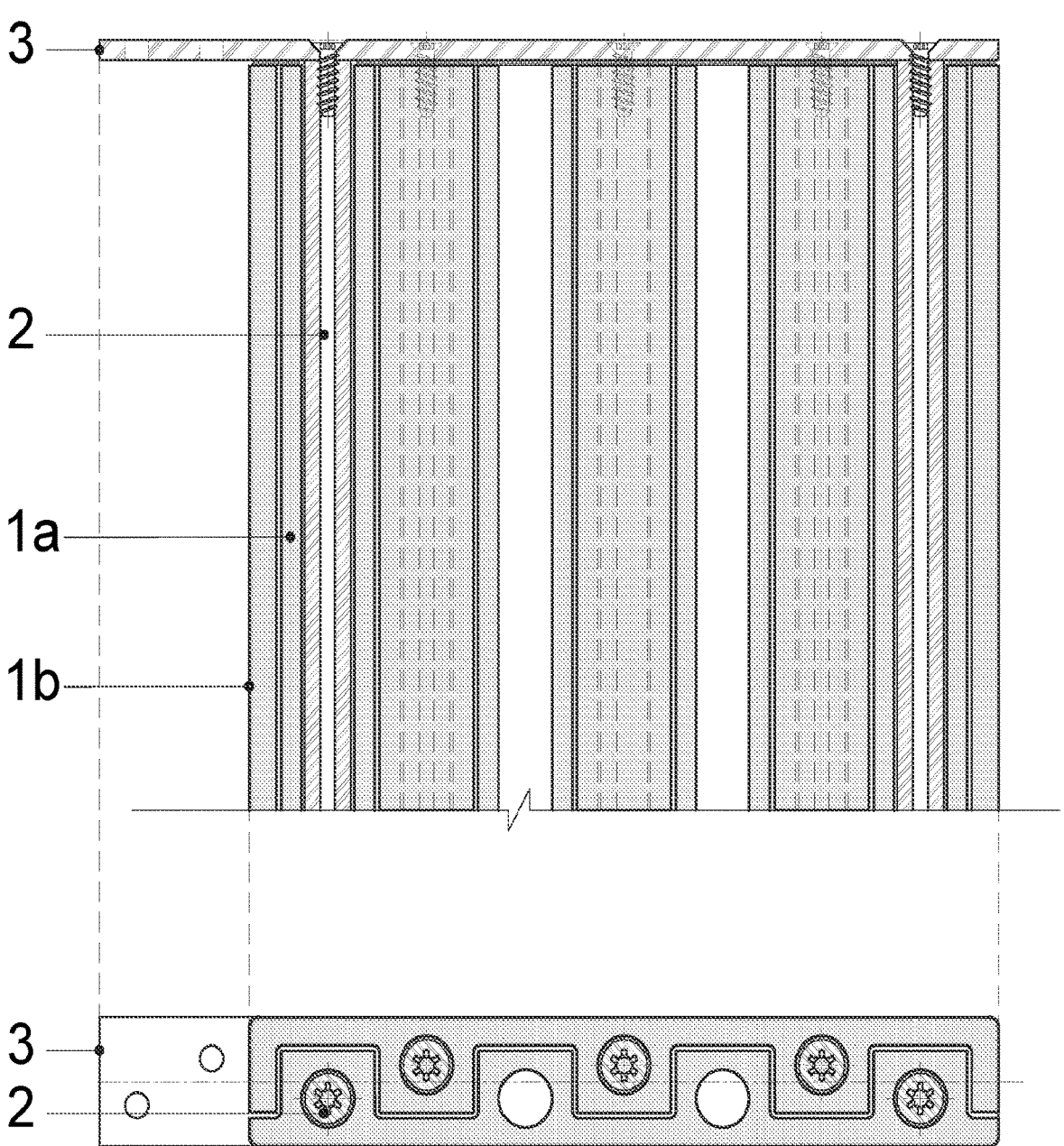
FIG. 9 illustrates a top sectional view of the embodiment illustrated in FIG. 2, FIGS. 10 and 11 illustrate end views of the prior art, FIG. 12 schematically illustrates an end view of a ninth embodiment according to the present invention, FIG. 13 schematically illustrates an end view of a tenth embodiment according to the present invention, FIG. 14 schematically illustrates an end view of an eleventh embodiment according to the present invention, FIG. 15 schematically illustrates an end view of a twelfth embodiment according to the present invention, FIG. 16 schematically illustrates an end view of a thirteenth embodiment according to the present invention, FIG. 17 schematically illustrates an end view of a fourteenth embodiment according to the present invention, and FIG. 18 schematically illustrates an end view of a fifteenth embodiment according to the present invention.
Figure 10:
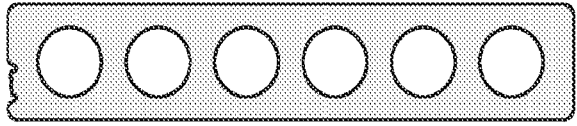
Figure 11:
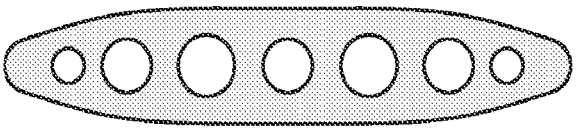

Referring to the drawings, FIG. 1 illustrates one embodiment in which the two complementarily-shaped ceramic elements 1a, 1b each have two plateaus 4 each in the shape of a substantially rectangular parallelepiped and having a cylindrical opening 5 therethrough, and a protruding edge 6 in the shape of a substantially rectangular parallelepiped along one side thereof. The outer opposite surfaces 9 of the ceramic elements 1a, 1b are flat after being secured together, and with the joint 7 between the elements formed at perpendicular edges after the elements are secured together. The inner tube 2 is inserted into the cylindrical openings, with the end plate 3 being secured against a lateral edge of the elements 1a, 1b by the screws 8 as illustrated, in turn securing the complementary-shaped elements together (best seen in the top view illustrated in FIG. 9 with respect to the embodiment illustrated in FIG. 2 infra).

The side of each said element opposite the flat outer surface 9 thereof, i.e., the inner surface having the respective plateaus 4 and valleys 10 therebetween, is rested against the rollers when passing through the kiln. One of the elements, e.g., element 1b, is then inverted to be secured to element 1a. The drawings also indicate preferred dimensions in inches and millimeters (in brackets) of the composite element after being secured together. The composite element can have different sizes with different dimensions in similar proportions to one another.

Figure 2:
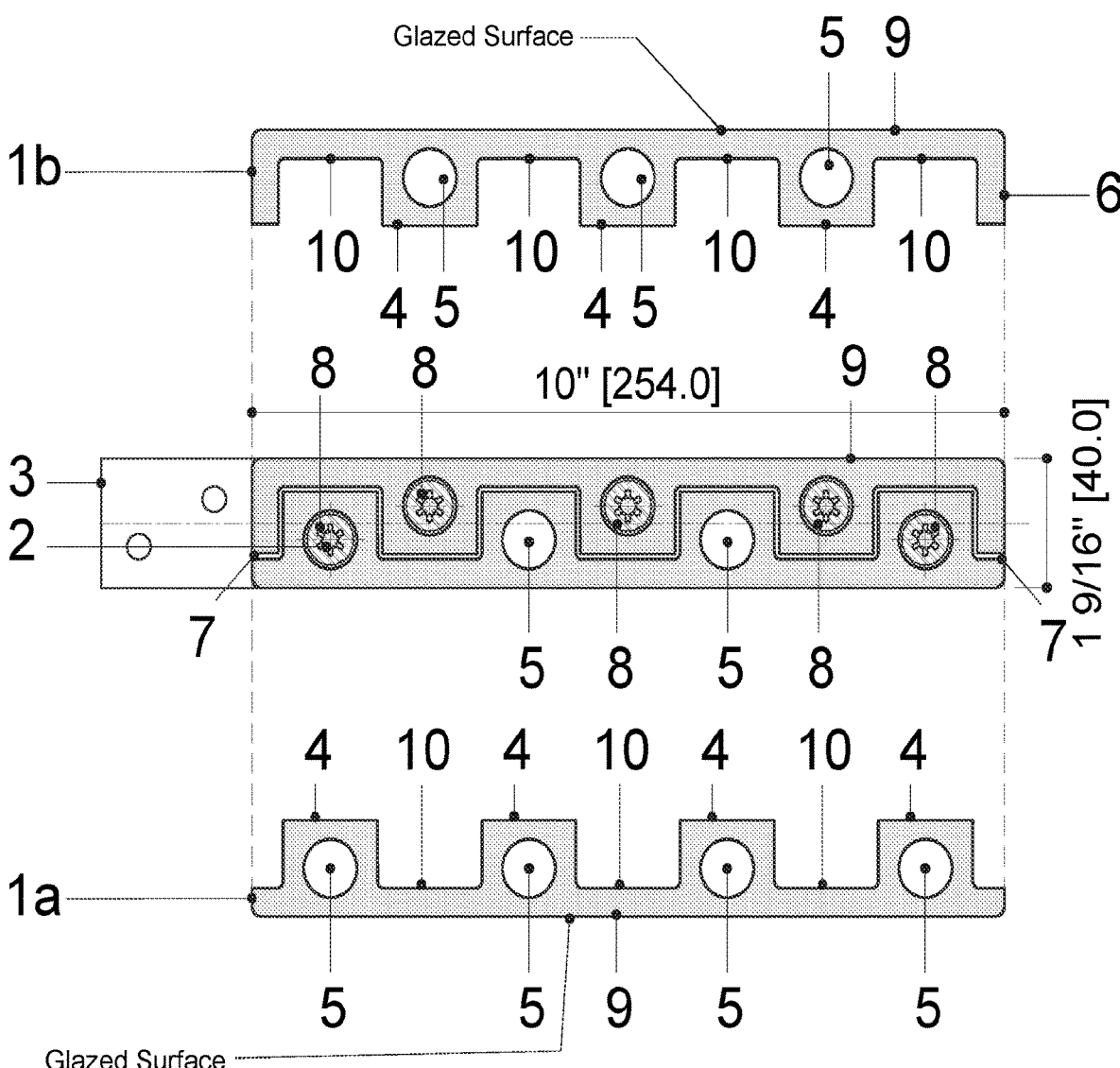

FIG. 2 illustrates one embodiment in which one 1a of the complementarily-shaped ceramic elements 1a, 1b has four plateaus 4 each in the shape of a substantially rectangular parallelepiped and having a cylindrical opening 5 therethrough, and the other element 1b has three plateaus 4 each in the shape of a substantially rectangular parallelepiped and having a cylindrical opening 5 therethrough, and two protruding edges each in the shape of a substantially rectangular parallelepiped along opposite sides thereof. The outer opposite surfaces 9 of the ceramic elements 1a, 1b are also flat after being secured together, with the joint 7 between the elements formed at opposite lateral edges 11 of the composite after the elements are secured together.

FIG. 2 illustrates glazing of the outer surfaces 9 of the composite before or after each element 1a, 1b has passed through the kiln and before the elements are secured together to form the composite.

Figure 3:
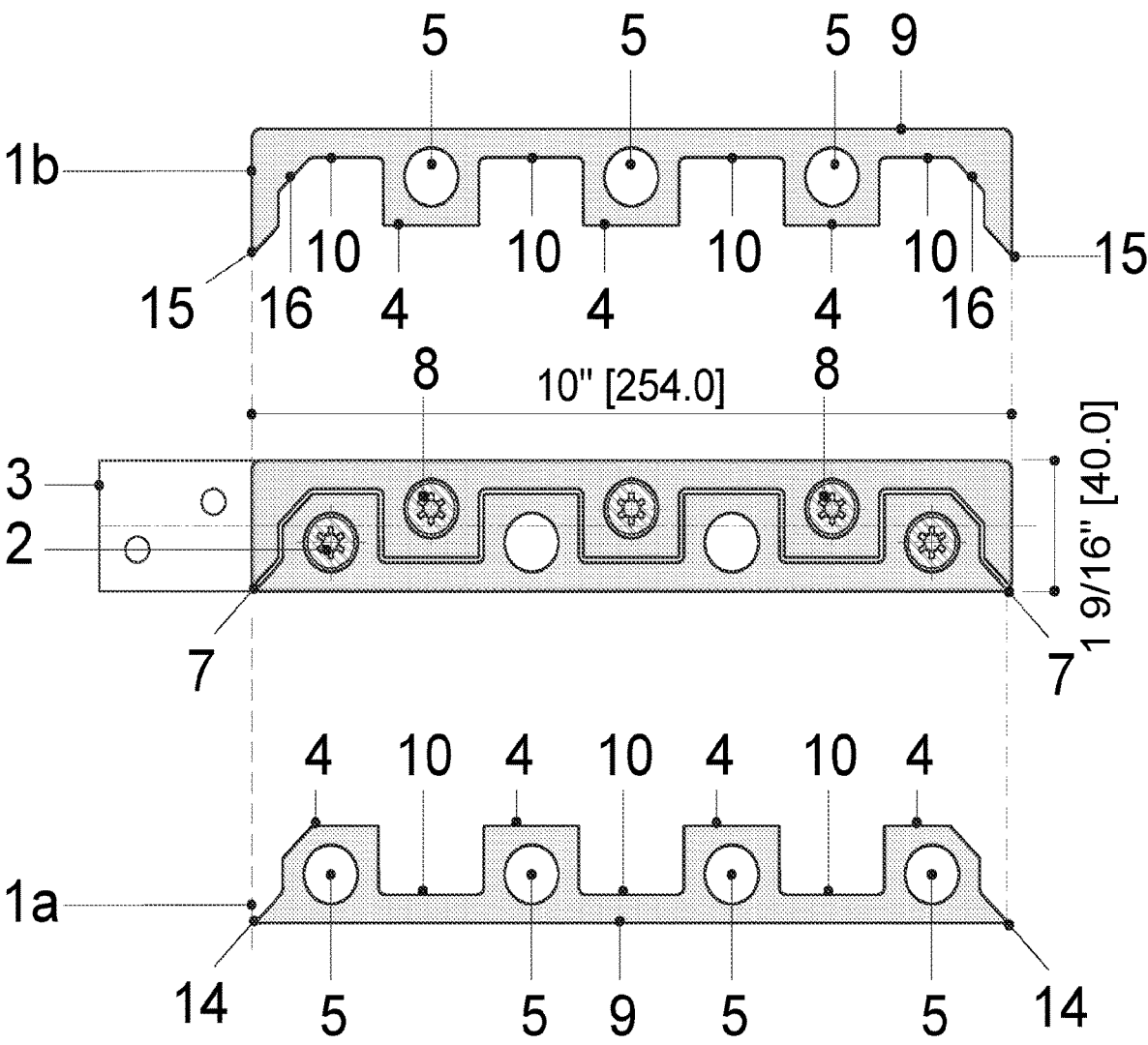

FIG. 3 illustrates one embodiment in which one 1a of the elements 1a, 1b has four plateaus 4 each in the shape of a substantially rectangular parallelepiped and having a cylindrical opening 5 therethrough, with two outer plateaus each having a chamfer 12 extending outwardly towards an edge 14 of the joint, and with edges 13 of said element 1a on outer sides of the two outer plateaus also inclined toward the edge of the joint (e.g., in zigzag fashion). The other element 1b has three plateaus 4 each in the shape of a substantially rectangular parallelepiped and having a cylindrical opening 5 therethrough, and two protruding edges each in the shape of a substantially rectangular parallelepiped along opposite sides thereof and having an inner zig-zag surface 16 angled outwardly towards the edge 15 of the joint. The composite has flat outer surfaces 9 after the elements are secured together, and with the joint 7 formed at corners on the same side of the composite.

The individual elements 1a, 1b are formed by extrusion in a die, prior to firing in a kiln. In this regard, the zig-zag edges formed by chamfer 12 and edges 13, 14 of element 1a can be formed by machining or cutting with a tool after extrusion or even after firing, with zig-zag surfaces 16 and edges 15 of element 1b also formed by machining or cutting with a tool after extrusion or even after firing. For example, the elements 1a, 1b shown in the embodiment illustrated in FIG. 2 can be machined to form the zig-zag corners in the embodiment illustrated in FIG. 3.

Figure 4:
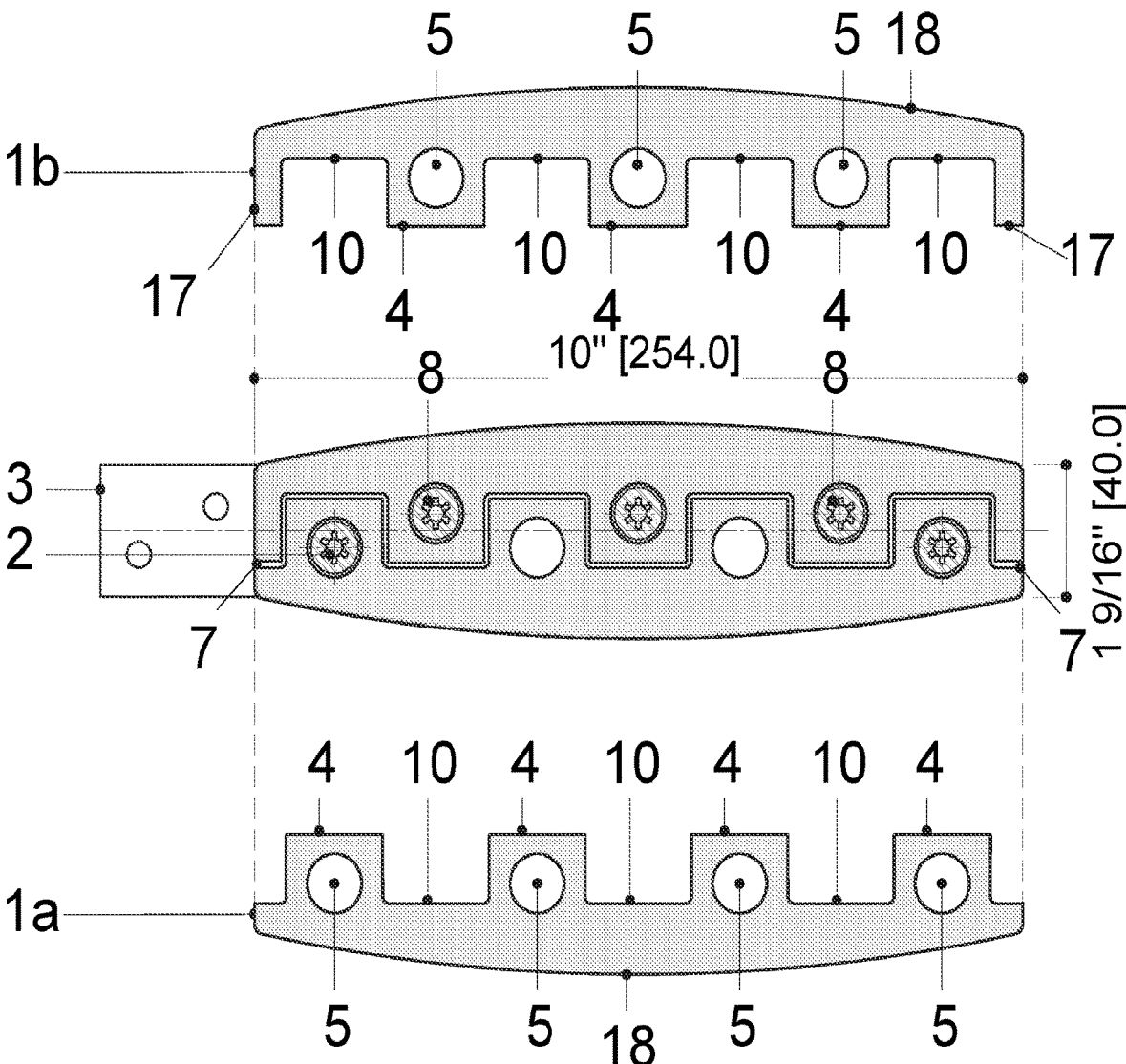

FIG. 4 illustrates one embodiment in which one 1a of the elements 1a, 1b has four plateaus 4 each in the shape of a substantially rectangular parallelepiped and having a cylindrical opening 5 therethrough, and the other 1b element has three plateaus 4 each in the shape of a substantially rectangular parallelepiped and having a cylindrical opening 5 therethrough, and two protruding edges 17 each in the shape of a substantially rectangular parallelepiped along opposite sides thereof.

The composite has convexly-shaped opposite surfaces 18 after the elements are secured together, with the joint 7 formed at opposite lateral edges of the elements 1a, 1b. These surfaces 18 are inherently unstable when passing along rollers in the kiln. However, the present embodiment, which positions the opposite internal surface having the plateaus 4 of each composite element 1a, 1b against the rollers, ensures these curved surfaces 18 are smoothly, uniformly fired within the kiln and subsequently glazed.

Figure 5:
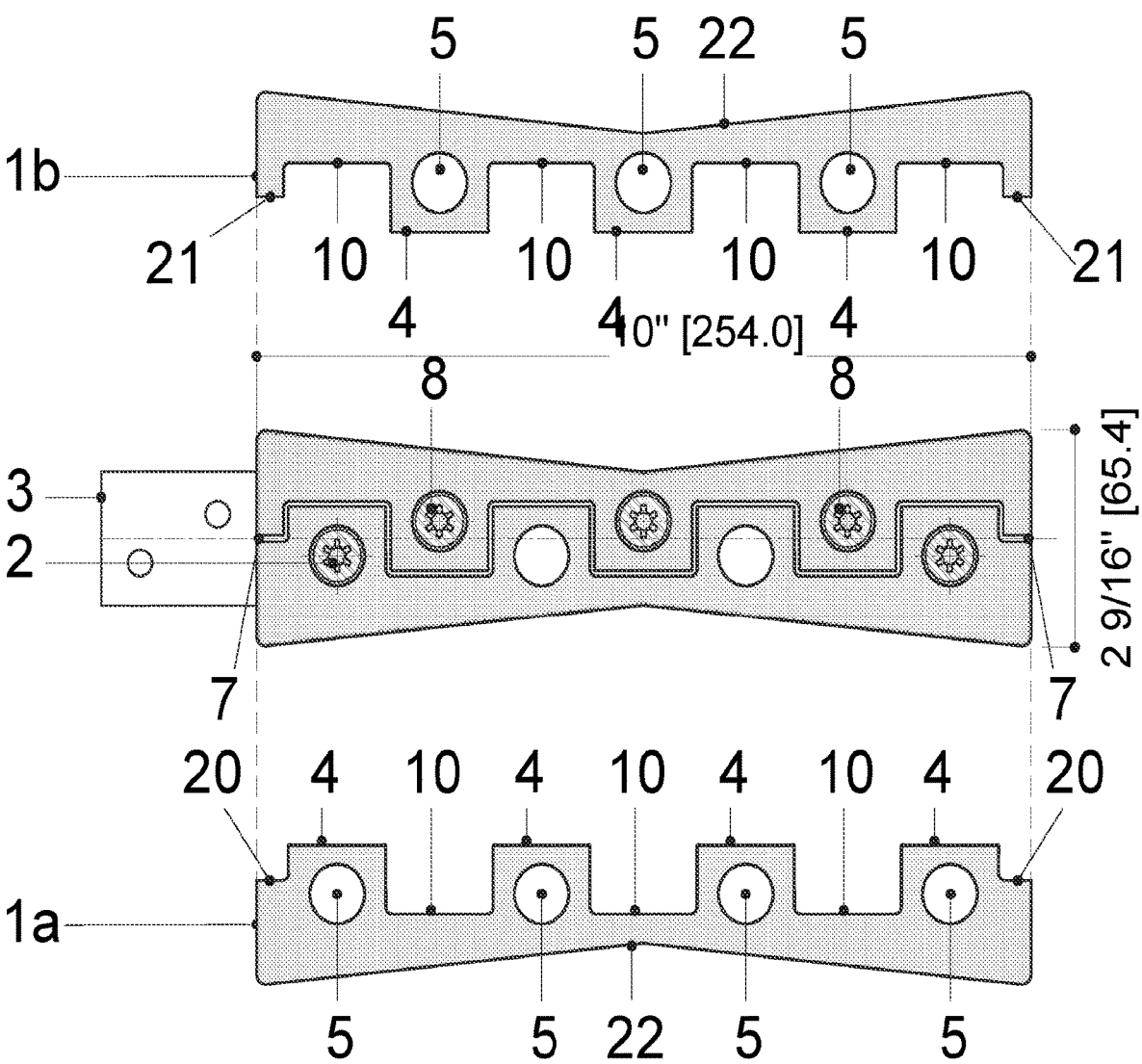

FIG. 5 illustrates one embodiment in which one 1a of the elements 1a, 1b has four plateaus 4 each in the shape of a substantially rectangular parallelepiped and having a cylindrical opening 5 therethrough. The two outer plateaus each have a longer inner lateral side 19 and shorter outer lateral side 20, designed to facilitate mating with the other element 1b. The other element 1b has three plateaus 4 each in the shape of a substantially rectangular parallelepiped and having a cylindrical opening 5 therethrough, and two protruding edges 21 each in the shape of a substantially rectangular parallelepiped along opposite sides thereof.

The composite has substantially V-shaped opposite surfaces 22 after the elements are secured together, with the joint 7 formed at opposite lateral edges of the elements. As with the embodiment illustrated in FIG. 4 supra, these surfaces are also inherently unstable when passing along rollers in the kiln. However, the present embodiment, which also positions the opposite internal surface having the plateaus 4 of each composite element 1a, 1b against the rollers, ensures these surfaces 22 are smoothly, uniformly fired within the kiln and subsequently glazed.

Figure 6:
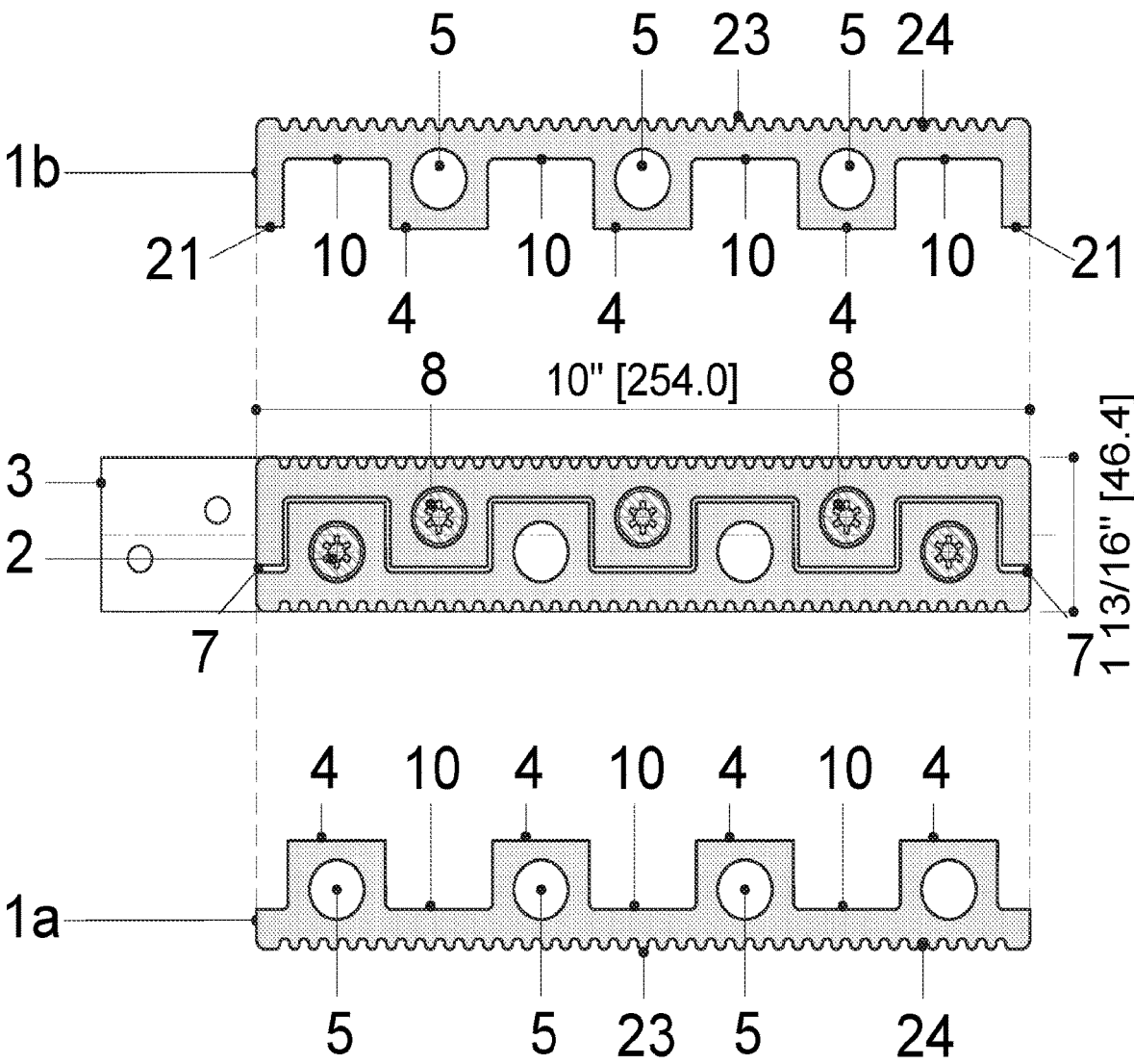

FIG. 6 illustrates one embodiment in which one 1a of the elements 1a, 1b has four plateaus 4 each in the shape of a substantially rectangular parallelepiped and having a cylindrical opening 5 therethrough, and the other element 1b has three plateaus 4 each in the shape of a substantially rectangular parallelepiped and having a cylindrical opening 5 therethrough, and two protruding edges 21 each in the shape of a substantially rectangular parallelepiped along opposite sides thereof.

The composite has rippled or corrugated opposite surfaces 23 after the elements are secured together, with the joint 7 formed at opposite lateral edges of the elements. The trenches 24 formed between the ripples or corrugations were normally ruined by contacting the rollers during firing. However, as with the illustrated embodiments supra, the present embodiments prevents these trenches 24 from being ruined by positioning the opposite, internal surfaces having the plateaus 4 of each ceramic component against the rollers when firing.

Figure 7:
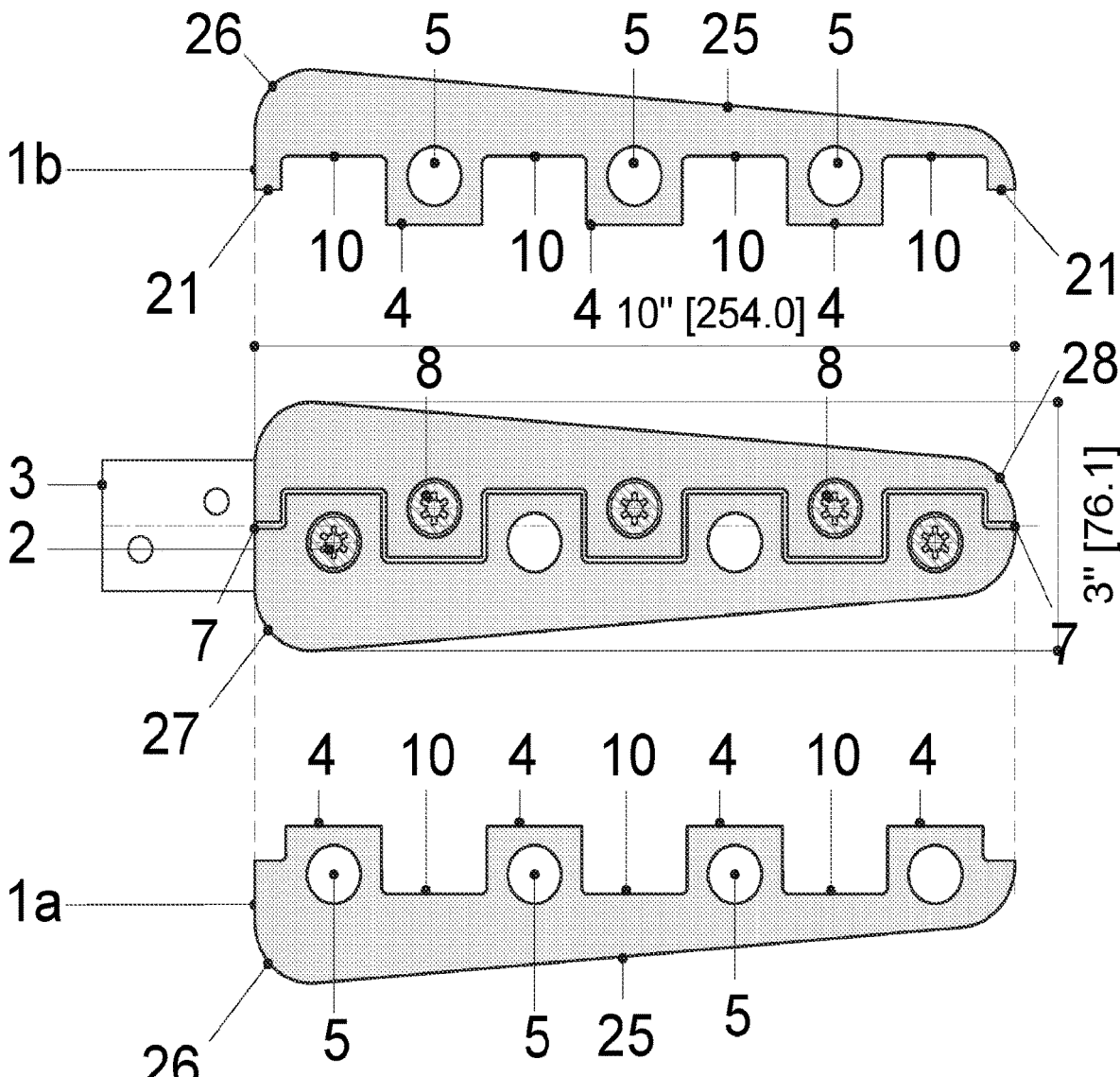

FIG. 7 illustrates one embodiment in which one 1a of the elements 1a, 1b has four plateaus 4 each in the shape of a substantially rectangular parallelepiped and having a cylindrical opening 5 therethrough, and the other element 1b has three plateaus 4 each in the shape of a substantially rectangular parallelepiped and having a cylindrical opening 5 therethrough. The outer surfaces 25 of the respective elements 1a, 1b are asymmetrically slanted as illustrated, to form a bulge or protrusion 26 at one end thereof, these bulges or protrusions 26 situated diametrically opposite one another as illustrated when the elements 1a, 1b are fastened together.

In the element 1a having four plateaus 4, the plateau remote from the bulge or protrusion 26 has a longer lateral side than the plateau immediately adjacent the bulge or protrusion 26, with the element 1b having three plateaus 4 having two protruding edges 21 each in the shape of a substantially rectangular parallelepiped along opposite sides thereof.

The composite has asymmetrically inclined opposite surfaces 25 after the elements are secured together, with the joint 7 formed at opposite lateral edges of the elements, i.e., between the large and small curved lateral ends 27, 28 as illustrated. As with the embodiments illustrated in FIGS. 4 and 5 supra, these surfaces are also inherently unstable when passing along rollers in the kiln. However, the present embodiment, which also positions the opposite internal surface having the plateaus 4 of each composite element 1a, 1b against the rollers, ensures these surfaces 25 are smoothly, uniformly fired within the kiln and subsequently glazed.

Figure 8:
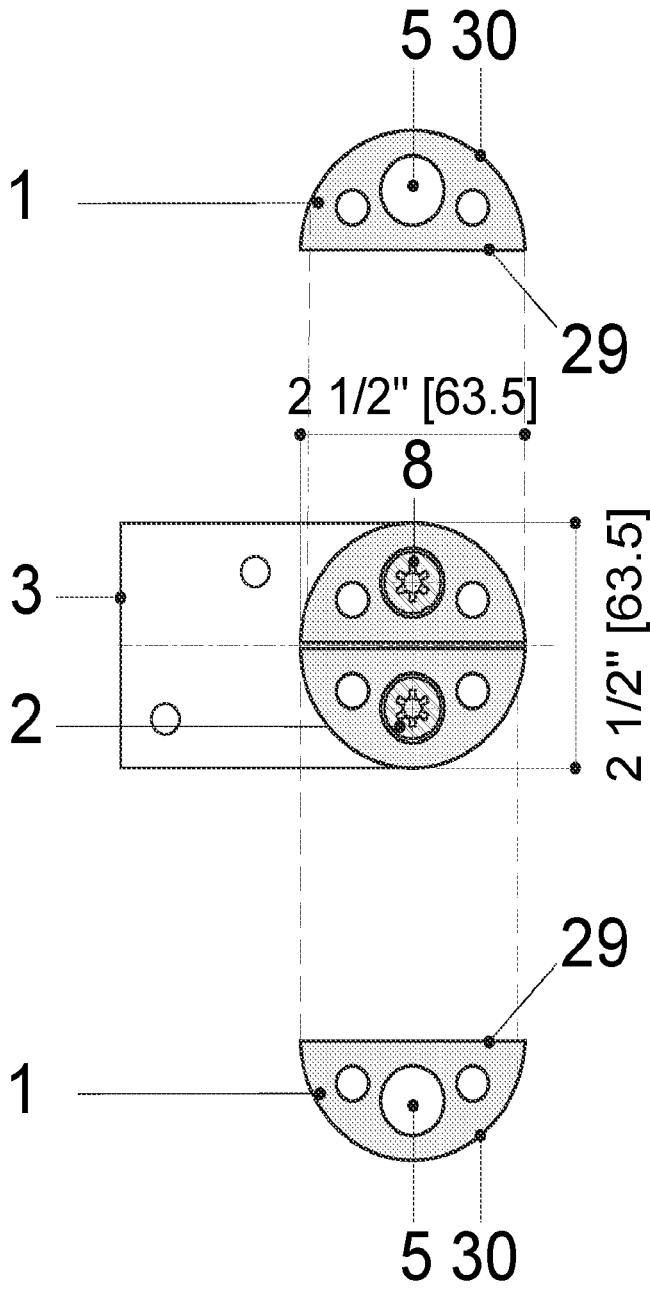

FIG. 8 illustrates one embodiment in which the elements 1 are essentially identical and each are in the shape of a semi-cylinder having a flat inner surface 29, an curved outer surface 30 and holes 5 for receiving tubes 2 and screws 7. As with the other embodiments described supra, the flat inner surfaces 29 are placed against the rollers in the kiln to be stably passed therethrough for firing, ensuring uniform, undamaged glazing of the outer curved surfaces 30.

The glaze is brushed on a smooth surface or combed onto a rough surface (e.g., FIG. 6). The ceramic elements are each fired in the kiln at temperatures of about 1100° C.-1200° C. for several hours a day. The tube 2 and plate 3 are each made of aluminum or stainless steel, while each element is ceramic or terra cota.

While the ceramic elements have been illustration having cylindrical openings, different shapes of such openings (e.g., square or rectangular cross-section) are also acceptable.

Figure 12:
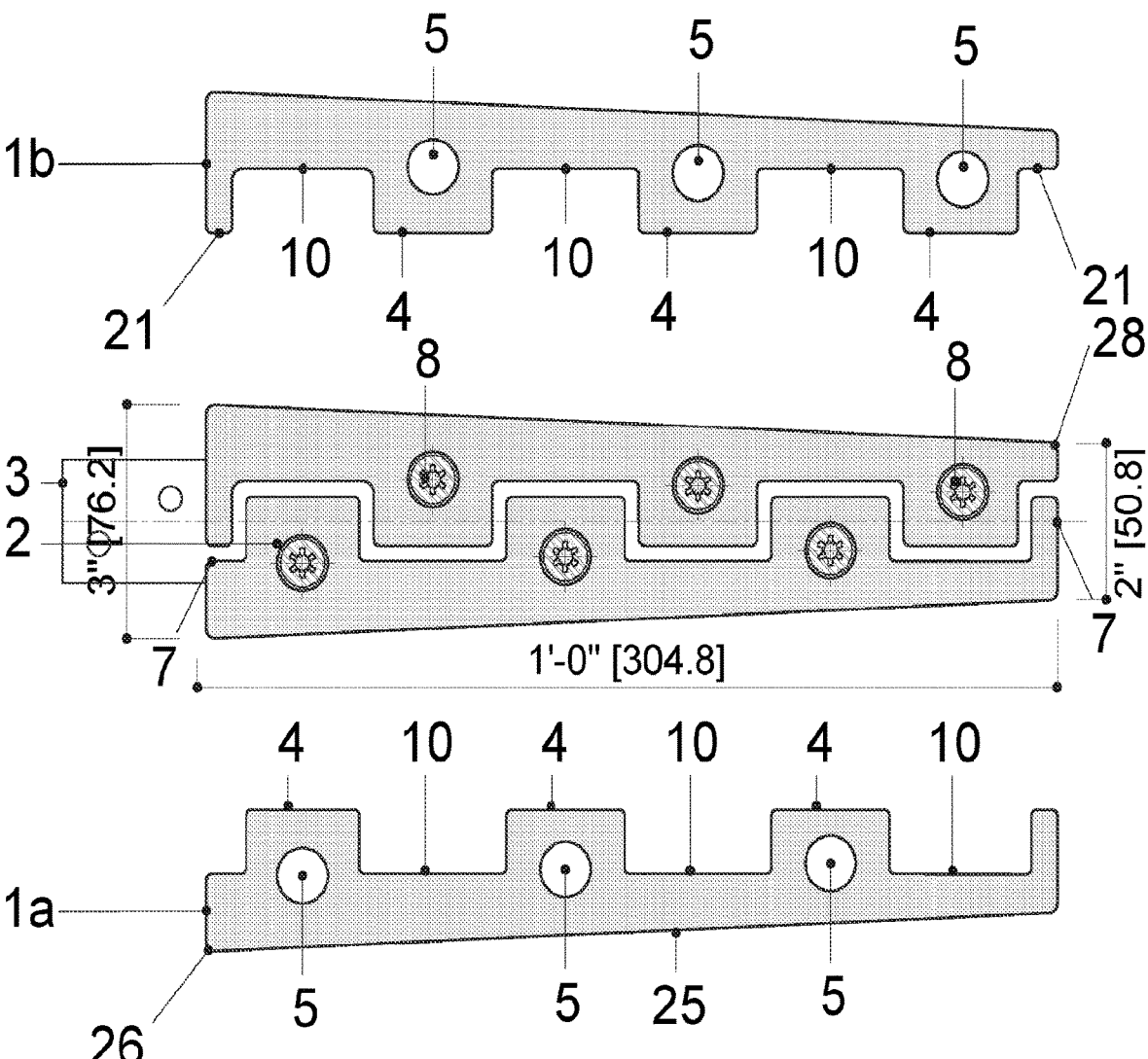

FIG. 12 schematically illustrates an end view of an additional embodiment in which both parts 1a and 1b have better support when produced on a roller kiln. More particularly, the corners 26 are sharp, unlike the bulges or protrusions 26 shown in the embodiment of FIG. 7.

Figure 13:
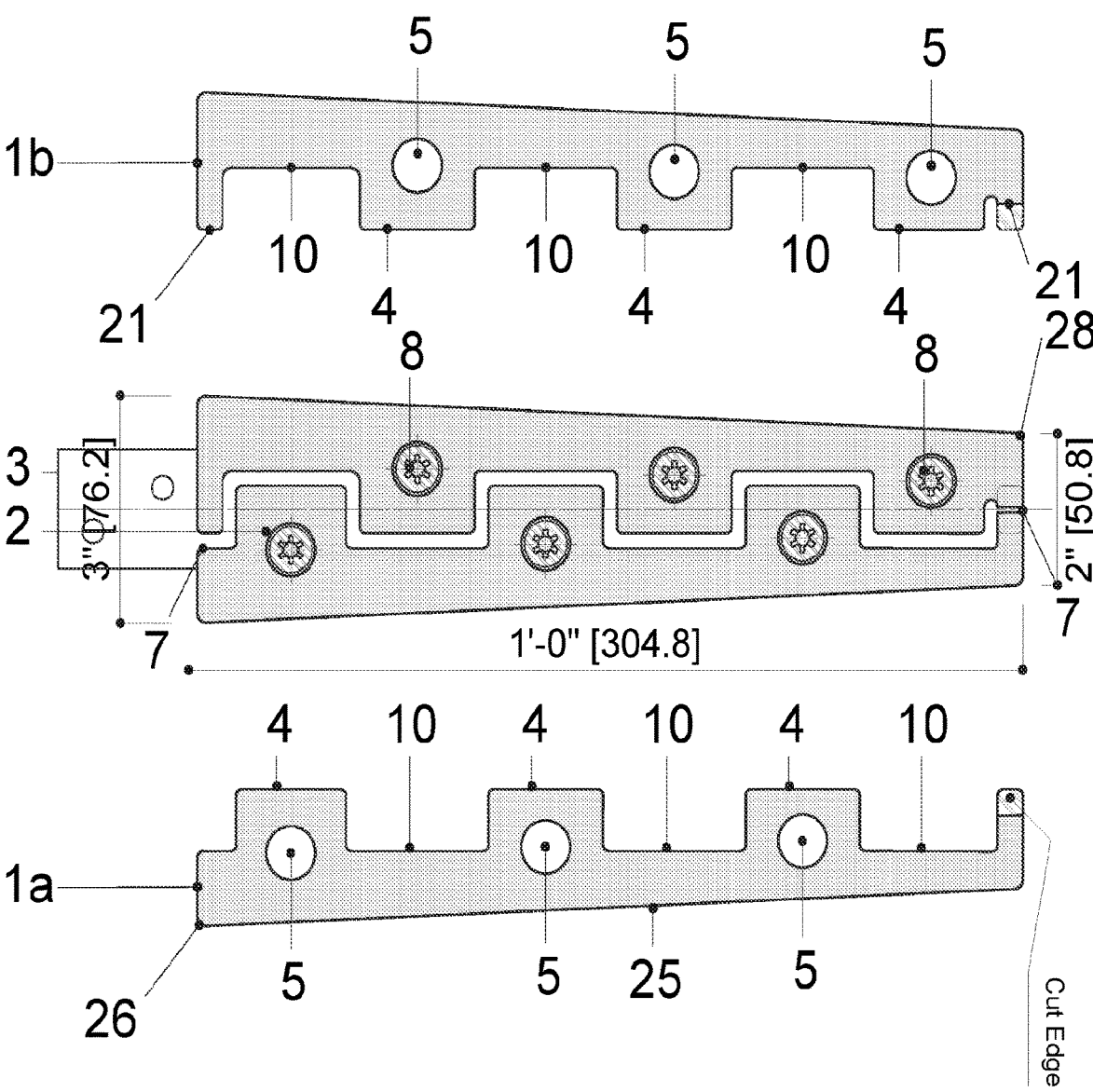

FIG. 13 illustrates an embodiment similar to FIG. 12, in which the front edge (from the viewing direction on the right) of each element 1a, 1b is cut as shown, before the two elements 1a, 1b are joined together. The cut joint forms a hairline joint 7 as shown which is (due to manufacturing tolerances) much less visible than the joint 7 shown in the other embodiments.

Figure 14:
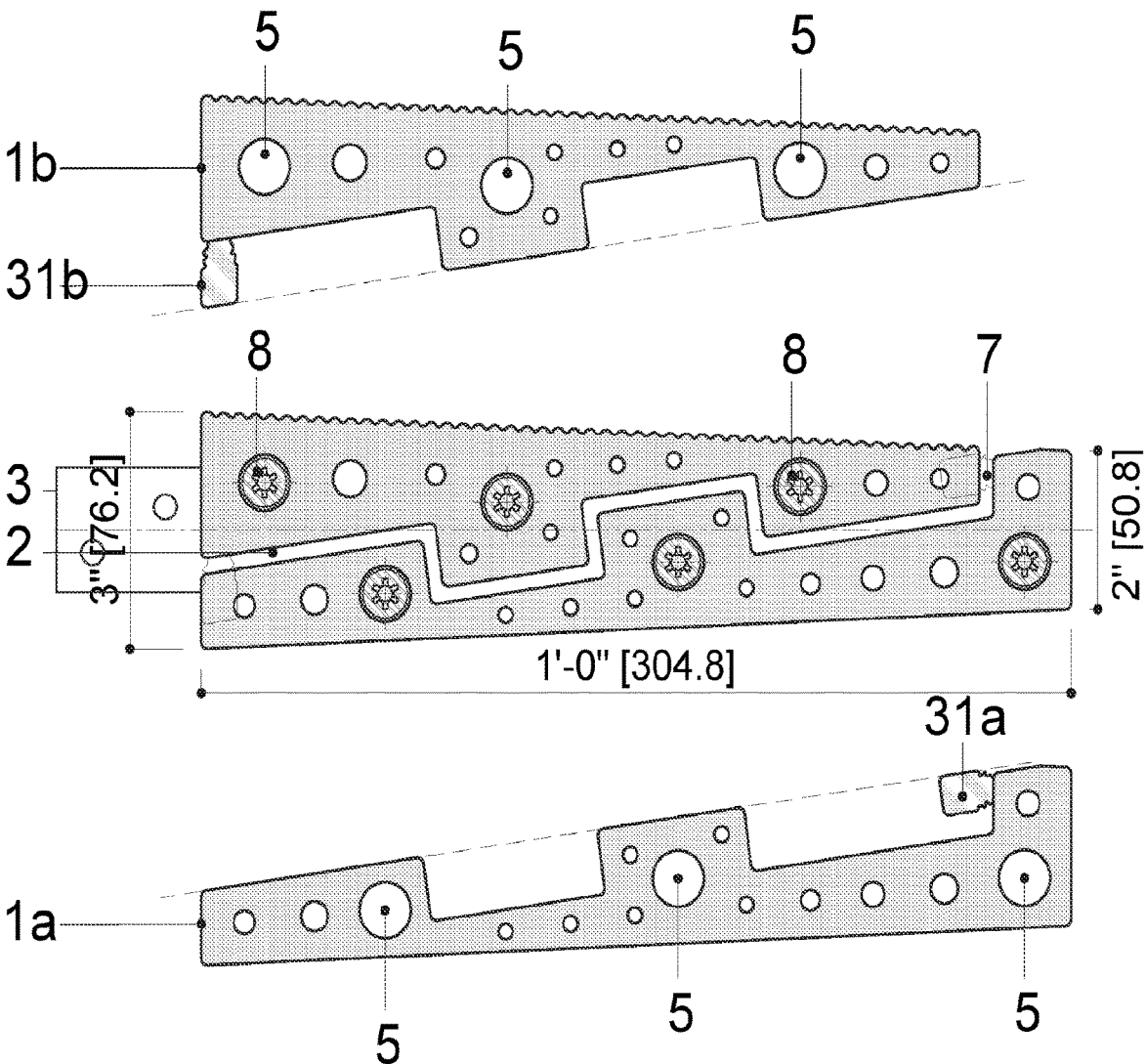

FIG. 14 schematically illustrates an end view of a further modification in the embodiment illustrated in FIG. 13, in which to conceal the joint line from the front view (from the right in FIG. 14), the joint 7 formed between elements 1a and 1b is not located in the front of the joined composite. Additionally, elements 1a and 1b each include respective support legs or tabs 31a, 31b that will ultimately be cut off before joining the two elements together. The surface of one 1a of the elements 1a, 1b can be rippled as shown.

Figure 15:
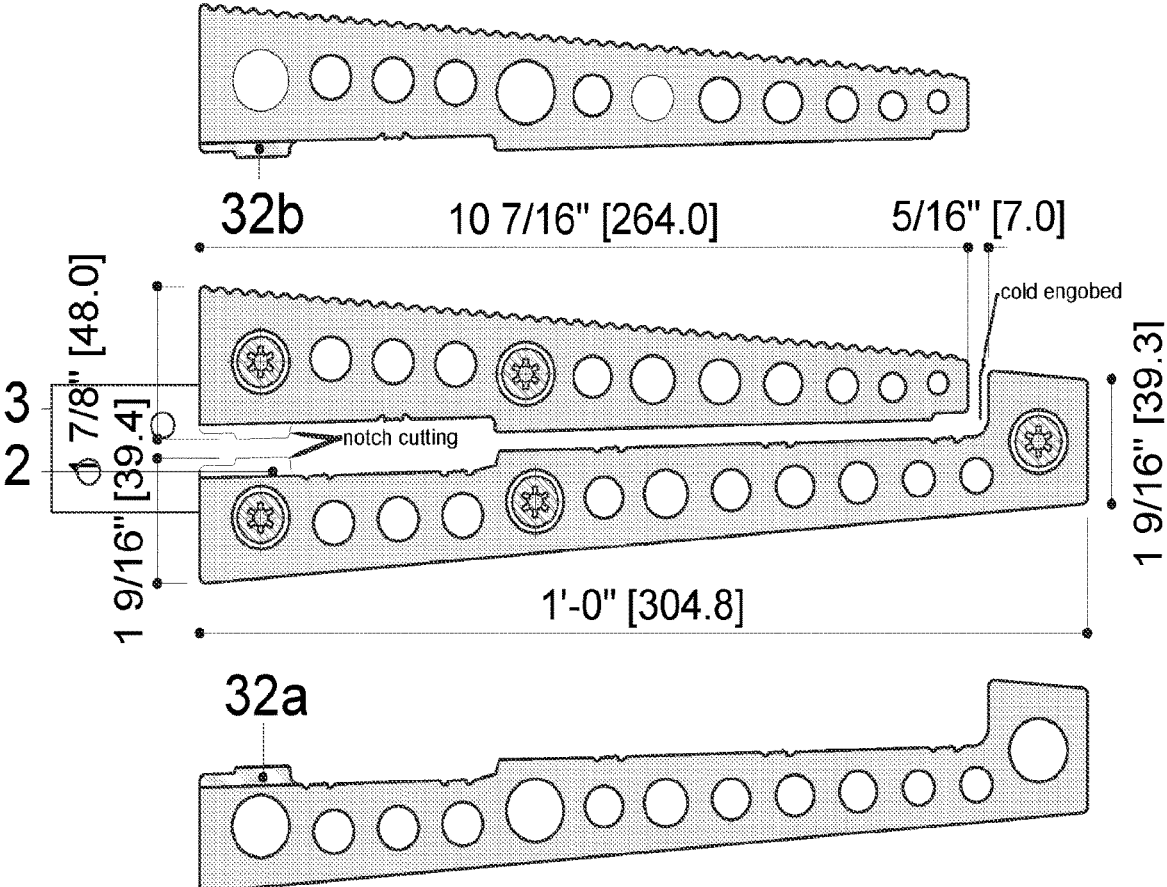

FIG. 15 schematically illustrates an end view of a further modification in the embodiment illustrated in FIG. 14, in which additional supports or tabs 32a, 32b of the individual elements 1a, 1b are cut off or notched before assembling the two elements 1a, 1b together. This also allows for an additional metal support to be inserted into the joined composite as illustrated.

Figure 16:
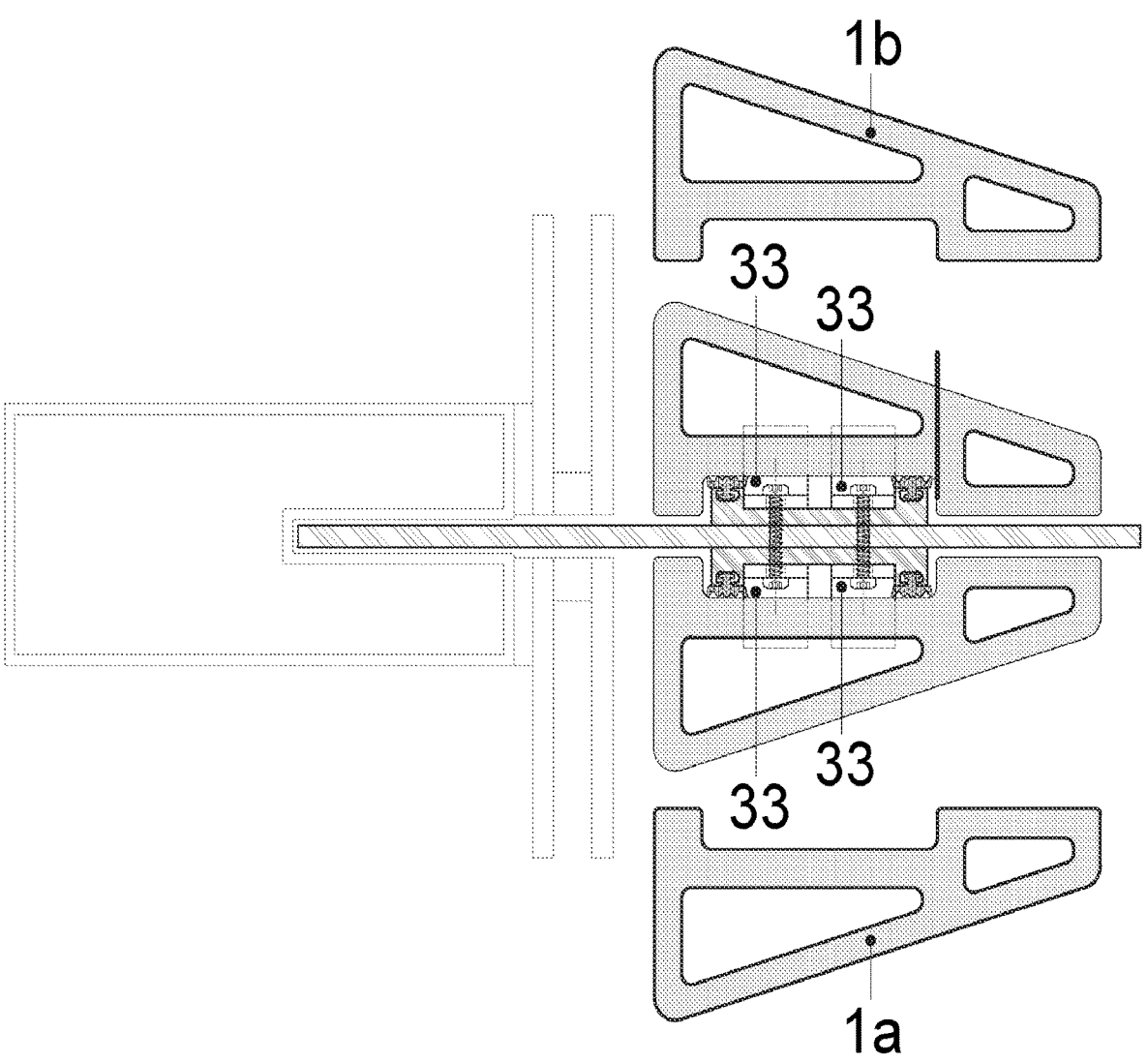

FIG. 16 schematically illustrates an end view of an embodiment in which the two symmetric individual elements 1a, 1b form a new trapezoidal shape when joined together. Additionally, due to the specifically-designed shape of the elements 1a, 1b, an additional metal support can be inserted in the middle of the composite and retain the two elements 1a, 1b together by using clips 33 as shown.

Figure 17:
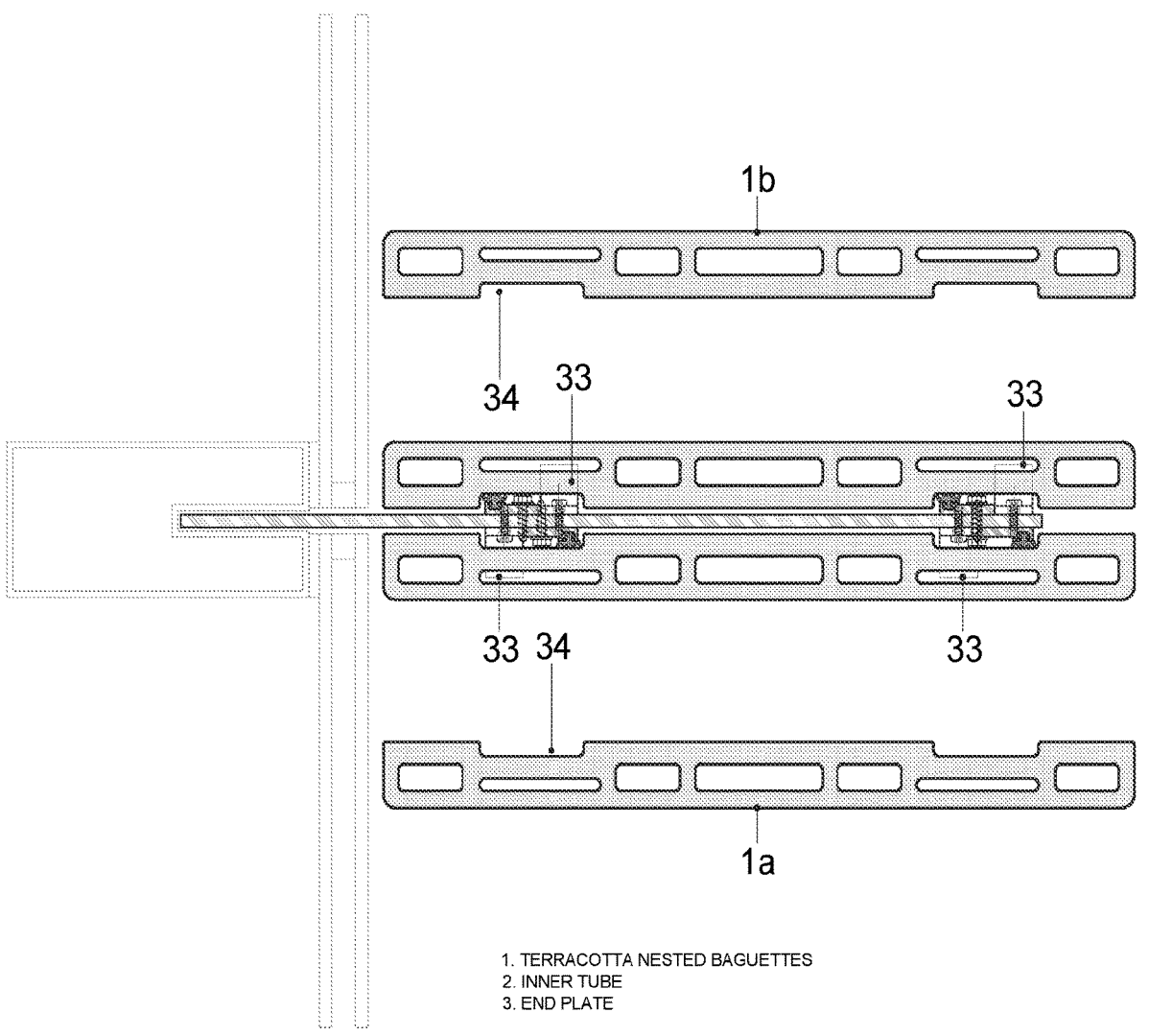

FIG. 17 schematically illustrates an end view of an embodiment in which the two symmetrical individual elements form a rectangular parallelepiped shape when joined together. Additionally, due to the specifically-designed shape of the elements 1a, 1b, an additional metal support can be inserted in the middle of the composite and hold the two elements 1a, 1b together, by using clips 33 which are inserted into the core slots/holes 34 as shown.

Figure 18:
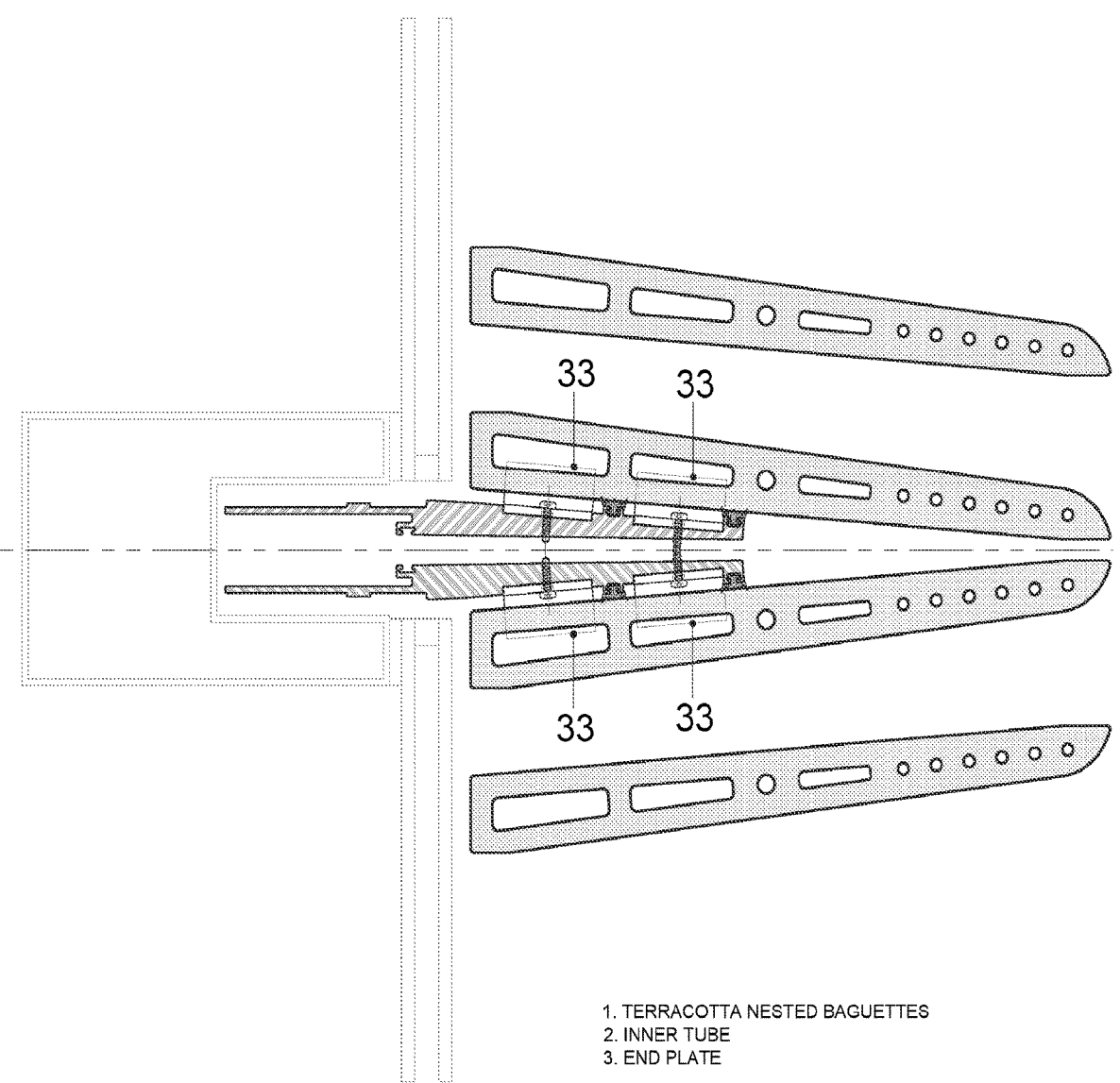

FIG. 18 schematically illustrates an end view of an embodiment in which the two symmetrical individual elements 1a, 1b form a rounded triangular shape when joined together, i.e., have a rounded apex. Additionally, due to the specific design of the elements 1a, 1b, an additional metal support can be inserted in the middle and hold the two elements 1a, 1b together by using clips 33 which are inserted into the core slots/holes of the elements 1a, 1b (hidden from view).

The preceding description of the present invention is merely exemplary and not intended to limit the scope thereof.

What is claimed is:

1. A pair of clay or ceramic elements configured to mate and be secured together in complementary fashion after being individually passed on rollers through a kiln, wherein
the elements each have asymmetrically inclined opposite surfaces configured to mate with one another, and
wherein support tabs on the surfaces configured to mate with one another, said support tabs configured to be cut or notched prior to interlocking.

2. The elements of claim 1, wherein
said elements each comprise a plurality of protruding plateaus and adjacent recesses each in the shape of a substantially rectangular parallelepiped, and
said elements are configured to mate with respective plateaus and recesses of the other element when interlocking with one another.

3. The elements of claim 2, wherein
a substantially flat lateral edge defined by said interlocking plateaus and recesses, and
said elements defining top, bottom, front, back and lateral surfaces when interlocked,
with said front and back surfaces being substantially flat and parallel to one another, and said lateral surfaces being substantially flat and parallel to one another, to define a noncircular shape when said elements are interlocked.

4. The elements of claim 3, wherein
said elements each comprise three plateaus each in the shape of a substantially rectangular parallelepiped and having an opening therethrough, and three recesses each complementarily shaped to mate with the respective plateaus of the opposite element.

5. The elements of claim 4, wherein
said elements each comprise a protruding edge along one lateral side thereof and extending in the direction of said opening, and
said protruding edges extending to different length from one another in a direction perpendicular to the opening.

6. The elements of claim 1, wherein
a front lateral edge of each said element is cut to form a hairline joint when the elements are joined together.

7. A pair of clay or ceramic elements configured to mate and be secured together in complementary fashion after being individually passed on rollers through a kiln, wherein
the elements each have inclined surfaces configured to mate with one another, and opposite surfaces configured to extend substantially parallel to one another, after the elements are interlocked together, and
wherein support tabs on the surfaces configured to mate with one another, said support tabs configured to be cut or notched prior to interlocking.

8. The elements of claim 7, wherein
said elements each comprise protruding plateaus and adjacent recesses, and
said elements are configured to mate with respective plateaus and recesses of the other element when interlocking with one another.

9. The elements of claim 8, wherein
one of said elements has a rippled surface on a side opposite said plateaus and recesses.

10. The elements of claim 7, wherein
the elements form a joint therebetween when mated together,
with an end of the joint opening on a lateral side of the elements, and an opposite end of the joint opening on one of the surfaces opposite the inclined surfaces.

11. The elements of claim 1, additionally comprising supports or tabs on the surfaces configured to mate with one another, said supports or tabs configured to be cut or notched before interlocking.

12. The elements of claim 11, wherein the elements form a joint therebetween when mated together, with an end of the joint opening on a lateral side of the elements, and an opposite end of the joint opening on one of the surfaces opposite the inclined surfaces.

13. The elements of claim 1, forming a trapezoidal shape when mated together.

14. The elements of claim 13, wherein each said element comprises two openings therethrough, each having a cross-section of a substantially right triangle.

15. The elements of claim 14, wherein said elements each have a recess substantially in the shape of a substantially rectangular parallelepiped, and arranged to receive clips interlocking said elements together through an intermediate support.

16. The elements of claim 1, forming a triangular shape with a rounded apex when mated together.

17. The elements of claim 16, wherein said elements are configured to receive a support therebetween and each said element comprises openings arranged to receive clips for holding the elements and support together.

\* \* \* \* \*